US006235417B1

(12) United States Patent
Wachsman et al.

(10) Patent No.: US 6,235,417 B1
(45) Date of Patent: May 22, 2001

(54) TWO-PHASE HYDROGEN PERMEATION MEMBRANE

(75) Inventors: Eric D. Wachsman, Gainsville, FL (US); Naixiong Jiang, Palo Alto, CA (US)

(73) Assignee: Her Majesty the Queen in right of Canada, as represented by the Minister of Natural Resources, Ottawa (CA)

(*) Notice: Subject to any disclaimer, the term of this patent is extended or adjusted under 35 U.S.C. 154(b) by 0 days.

(21) Appl. No.: 09/302,786

(22) Filed: Apr. 30, 1999

(51) Int. Cl.[7] ............................. B01D 53/22; C01B 3/02; C01B 3/24; C01B 3/26
(52) U.S. Cl. ...................................... 429/17; 95/56; 96/11; 252/373; 252/514; 423/648.1; 423/650; 423/651; 423/652
(58) Field of Search .................. 95/56; 96/11; 252/373, 252/514; 423/652, 648.1, 650, 651; 429/17

(56) References Cited

U.S. PATENT DOCUMENTS

| 3,413,777 | 12/1968 | Langley et al. ........................ 96/11 |
| 3,428,476 | 2/1969 | Langley et al. ........................ 427/229 |
| 4,851,303 | 7/1989 | Madou et al. ......................... 429/13 |
| 5,250,184 | 10/1993 | Maier .................... 210/653 |
| 5,387,330 | 2/1995 | Taniguchi et al. ................... 204/421 |
| 5,496,655 | 3/1996 | Lessing ................... 429/34 |
| 5,604,048 | 2/1997 | Nishihara et al. ...................... 429/44 |
| 5,616,223 | 4/1997 | Shen et al. ........................... 204/295 |
| 5,670,270 | 9/1997 | Wallin .................... 429/33 |
| 6,033,632 | * 3/2000 | Schwartz et al. ....................... 95/56 |
| 6,056,807 | * 5/2000 | Carolan et al. ......................... 96/11 |
| 6,066,307 | * 5/2000 | Keskar .............. 423/648.1 |

FOREIGN PATENT DOCUMENTS

| 2548 | * 1/1986 | (JP) ....................................... 96/11 |
| 121616 | * 6/1987 | (JP) ....................................... 96/11 |
| 29375 | * 2/1996 | (JP) . |

* cited by examiner

Primary Examiner—Wayne Langel
(74) Attorney, Agent, or Firm—Cooper & Dunham LLP

(57) ABSTRACT

A two-phase proton and electron conductor is described which comprises (a) a proton conductive oxides represented by the formula:

$$ABO_3$$

where A is selected from the group consisting of Ba, Ca, Mg and Sr and B is $Ce_{1-x}M_x$ or $Zr_{1-x}M_x$, where x has a value greater than zero and less than one and M is an element selected from the group consisting of Y, Yb, In, Gd, Nd, Eu, Sm and Tb, in combination with (b) an electron conductor comprising palladium. The palladium may be coated on particles of the oxide in the form of an oxide powder. This novel two-phase conductor is particularly useful as a mixed hydrogen ion and electronic conducting membrane for separating hydrogen from a hydrogen-containing gas.

13 Claims, 3 Drawing Sheets

TWO-PHASE HYDROGEN PERMEATION MEMBRANE

BACKGROUND OF THE INVENTION

1. Field of the Invention

This invention relates to a two-phase hydrogen permeation membrane utilizing the combination of a perovskite-type oxide and palladium metal and a process for separating hydrogen from a hydrogen-containing gas by means of the membrane.

2. Prior Art

Compressed natural gas is an economically competitive, widely distributed energy and chemical resource. This natural gas is converted to hydrogen more easily and efficiently than are liquid hydrocarbons and is less expensive per mole of hydrogen produced than any other fuel. Systems for producing hydrogen from natural gas could be enhanced through the use of thermally efficient, compact, catalytic membrane reactors.

Advances in membrane reactor technology allow economic production of high purity hydrogen from natural gas by coupling steam reforming and hydrogen transport in one step. Removal of product hydrogen continuously through the membrane shifts the equilibrium toward increased hydrogen production. Although palladium metal alloy membranes have been available for several decades, they are expensive and require large areas for adequate fluxes in commercial applications.

Palladium metal alloy membranes are being used for high purity hydrogen separation. Partial oxidation of natural gas has also been studied using catalyst and oxide ion conducting membrane technology. Currently, the combination of these two steps into a single step is not available.

Electrocatalytic conversion of methane to higher hydrocarbons and to synthesis gas has been reported in the literature and both approaches use solid, oxygen-ion conducting ceramics and involve partial oxidation. At high conversions, partial oxidation runs the risk of producing undesirable deep oxidation products ($CO_2$ and $H_2O$), thus limiting hydrogen yields.

Recently, a series of perovskite-type oxides (e.g. $BaCe_{1-x}M_xO_3$, where M is a metal dopant) have been shown to have a high proton conductivity at elevated temperatures.

These perovskite-type oxides have been shown to have a high proton conductivity and elevated temperatures, e.g. a conductivity of $10^{-2}\Omega^{-1}$ cm$^1$ at 600° C.

This ionic conductivity is comparable to that observed for oxygen-ion conduction in $La_{1-y}Sr_yCo_{1-x}M_xO_3$ perovskite-type oxides. $La_{1-y}Sr_yCo_{1-x}M_xO_3$ are mixed conductors in that they conduct both oxygen ions and electrons, and have they received considerable attention for application as oxygen permeation membranes. Because of their significant electronic conductivity, they have an internal electrical short and $O_2$ will selectively permeate through the material under a differential oxygen partial pressure ($P_{O2}$). The potential permeation flux rates of these materials are extremely high. For example, calculations show $O_2$ flux rates through a 50-$\mu$m—thick membrane of $La_{0.6}Sr_{0.4}Co_{0.8}Cu_{0.2}O_3$ at 600° C. to be 22400 L (STP) h$^{-1}$·m$^{-2}$ of membrane surface area under a 0.21 atm $P_{O2}$ gradient.

$BaCe_{1-x}M_xO_3$-type protonic conductors have sufficient ionic conductivity to obtain comparable flux rates. However, they have insufficient electronic conductivity. If comparable electronic conduction could be obtained with the $BaCe_{1-x}M_xO_3$-type protonic conductors, they would be excellent $H_2$ permeation membrane materials, equivalent to palladium alloy films.

A second potential application of solid-state high temperature protonic electrolytes is the production of higher hydrocarbons such as $C_6H_6$ and $C_7H_8$ from $CH_4$:

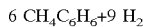

The decomposition and conversion of methane into benzene ($C_6H_6$ and $C_7H_8$) is thermodynamically favored at moderate temperatures (500° C.) and moderate pressures (1 to 10 atm) when hydrogen is continuously removed to low levels (<0.05 atm). A suitable dehydrogenation catalyst with low coking tendency (Pt or Pd), combined with a small pore zeolite for hydrode-cyclization of $C_{2+}$ intermediates (such as $C_2H_4$), could give high yields of aromatics. Electrochemical pumping is essential to increase the rate of $H_2$ removal, since little driving force for H diffusion exists with low $H_2$ partial pressures on both sides of the membrane.

Electrocatalytic conversion of methane to higher hydrocarbons and to syn gas has been reported in the literature. Both of these approaches used solid, oxygen-ion conducting ceramics. Under these conditions, both approaches are partial oxidation routes At high conversions, partial oxidation runs the risk of producing undesirable, deep oxidation products ($CO_2$ and $H_2O$), thus limiting $H_2$ yield. A preferable route is to electrocatalytically abstract an H from $CH_4$ by using a protonic conductor. The resulting $CH_3$ fragments would form higher hydrocarbons in the reacting gas stream, and pure $H_2$ would be produced on the other side of the membrane.

As examples of the state of the art, Langley et al. U.S. Pat. No. 3,413,777 describes a hydrogen permeation membrane comprising palladium particles dispersed in a non-conductive glaze on a porous ceramic support.

In Taniguchi et al. U.S. Pat. No. 5,387,330, ionic conductors are described which are perovskite-type oxides of the formula $BaCe_{1-x}M_xO_{3-\alpha}$. In this formula, M is a rare earth element such as Gd, Tb, Dy, Ho or Er. These oxides have been shown to have excellent proton conductivity together with oxide ion conductivity. However, they exhibit no significant electronic conduction.

Lessing, U.S. Pat. No. 5,496,655 describes catalytic interconnected plates for fuel cells. Among a variety of electrolyte compositions, $BaCe_{0.9}Gd_{0.1}O_3$ may be used. This system is used as a fuel cell for reformation of hydrocarbon fluids into hydrogen, CO and $CO_2$.

Nishihara et al. U.S. Pat. No. 5,604,048 describes a tubular-type fuel cell containing an electro conductive ceramic. Perovskite-type composite oxides are used in the production of these ceramics.

In Shen et al. U.S. Pat. No. 5,616,223, mixed oxygen-ion and electronic conducting composite materials are described which include a $CeO_2$-based oxygen ion conductor material mixed with palladium or a palladium alloy as an electronic conductor metal phase.

Wallin, U.S. Pat. No. 5,670,270 relates to an electro chemical device with a solid state electrolyte membrane. Suitable ionically-conductive materials include gadolinium-doped ceria.

It is an object of the present invention to provide solid conductor materials having both good proton and electron conductivity.

It is a further object to provide an improved process for separating hydrogen from a hydrogen-containing gas.

It is still a further object to provide an improved process for converting methane to hydrogen and higher hydrocarbons.

SUMMARY OF THE INVENTION

The present invention in its broadest aspect relates to a two-phase proton and electron conductor which comprises (a) a proton conductive oxide represented by the formula:

$$ABO_3$$

where A is selected from the group consisting of Ba, Ca, Mg and Sr and B is $Ce_{1-x}M_x$ or $Zr_{1-x}M_x$, where x has a value greater than zero and less than one and M is an element selected from the group consisting of Y, Yb, In, Gd, Nd, Eu, Sm and Tb, and (b) an electron conductor comprising palladium applied to said proton conductive oxide. The palladium is also hydrogen permeable.

The palladium may be present in amounts of as much as 50 vol %, but is also highly effective in very low concentration of as little as $10^{-10}$ vol %. Preferably, the palladium is present in amounts of less than 5 volt, e.g. about 1 volt or less.

The palladium is preferably coated on the proton conductive oxide by applying it to the oxide powder. The palladium may be applied by a variety of known means, such as wet impregnation of the powder, electroless plating, fluidized bed chemical vapor deposition, etc. In this way, individual grains of the conductive oxide receive a coating of palladium. These conductive oxide grains preferably have sizes less than 45 μm.

Another embodiment of the invention comprises a process for hydrogen separation from a hydrogen-containing gas. The process comprises contacting a first side of a gas impermeable mixed hydrogen ion and electronic conducting membrane with the hydrogen-containing gas at an elevated pressure concurrently with contacting a second opposite side of the membrane with gas at a lower pressure than the hydrogen-containing gas. Hydrogen ions are withdrawn from the second opposite side of the membrane. The mixed hydrogen ion and electronic conducting membrane is a two-phase conductor comprising (a) a perovskite-type oxide of the formula:

$$ABO_3$$

where A is selected from the group consisting of Ba, Ca, Mg and Sr and B is $Ce_{1-x}M_x$ or $Zr_{1-x}M_x$, where x has a value greater than zero and less than one and M is an element selected from the group consisting of Y, Yb, In, Gd, Nd, Eu, Sm and Tb, and (b) is an electronic conductor comprising palladium applied to the proton conductive oxide.

The hydrogen separation process may comprise a variety of processes, such as reforming light hydrocarbons to produce synthesis gas (CO and $H_2$), separating $H_2$ from synthesis gas, converting natural gas ($CH_4$) to $H_2$ and higher hydrocarbons, such as benzene, operation of a hydrogen fuel cell, etc.

DESCRIPTION OF THE PREFERRED EMBODIMENTS

Example 1

A $BaCe_{0.85}Gd_{0.15}O_3$ powder was coated with Pd by using a fluidized bed chemical vapour deposition method developed at SRI International. The Pd precursor was Pd(II) acetylacetonate. This approach resulted in an extremely low level of Pd loading, with a film thickness of about 10 Å. For nominal 10 μm grains of $BaCe_{0.85}Gd_{0.15}O_3$, this corresponds to approximately $10^{-10}$ vol % Pd. The colour of the powder turned from cream to dark brown after coating. The level of Pd loading was so small that it could not be distinguished by XRD (~2% detection limit) or x-ray fluorescence (ppm level of detection).

Figure 1:
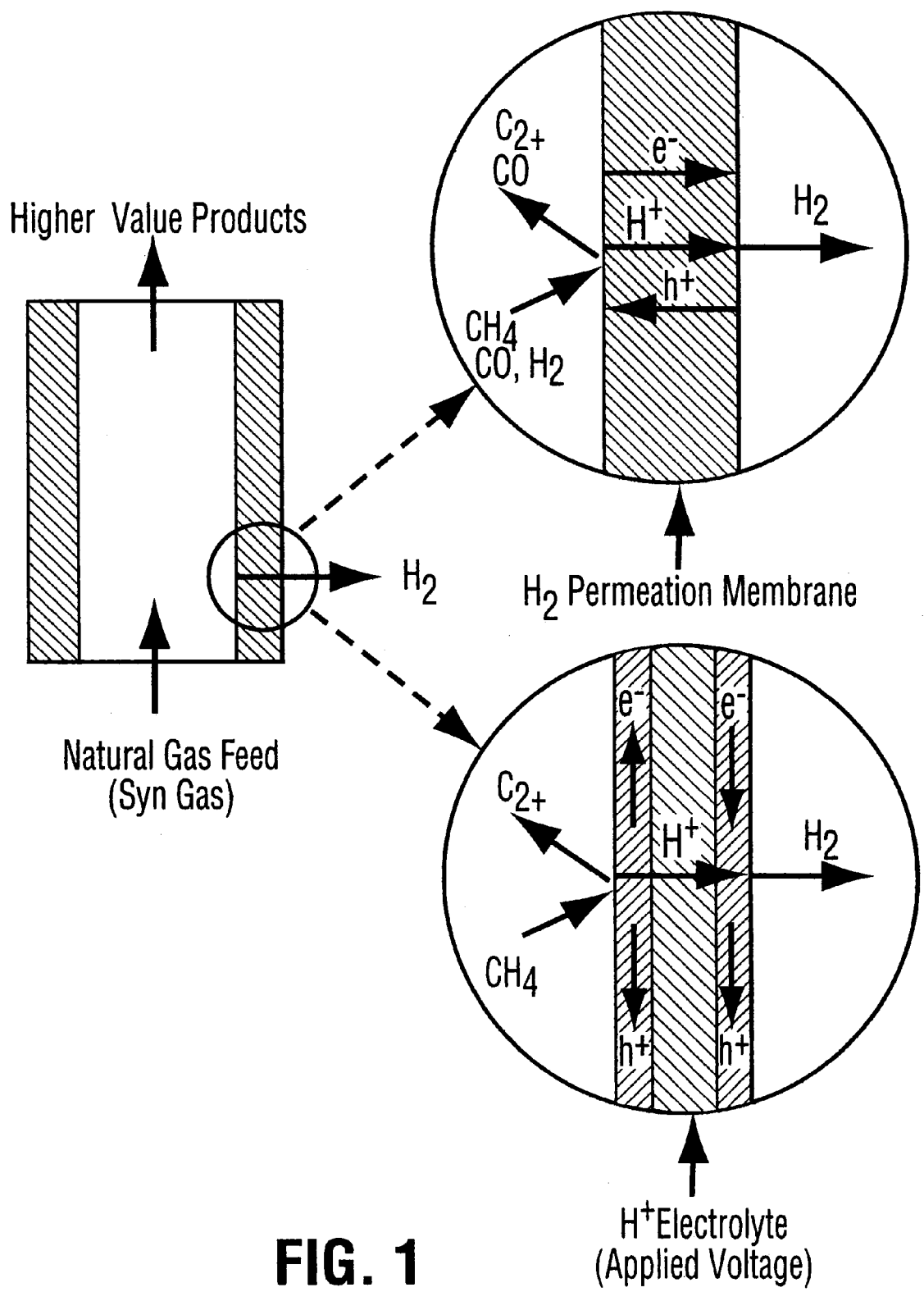
FIG. 1 is a schematic illustration of the hydrogen permeation according to the invention.

However, the resistivity of the powder changed dramatically. The powder was packed in a Teflon die and the DC resistance measured at room temperature under an applied pressure, to compact the grains and obtain a continuous conductive path. The resistivity of the uncoated powder was $1.4 \times 10^7$ (Ωcm) at 7900 psi, while the resistivity of the coated powder was $2.6 \times 10^5$ (Ωcm). The corresponding conductivities are plotted in FIG. 1 and compared to AC impedance data for sintered disks of $BaCe_{0.85}Gd_{0.15}O_3$ at elevated temperature.

Figure 2:
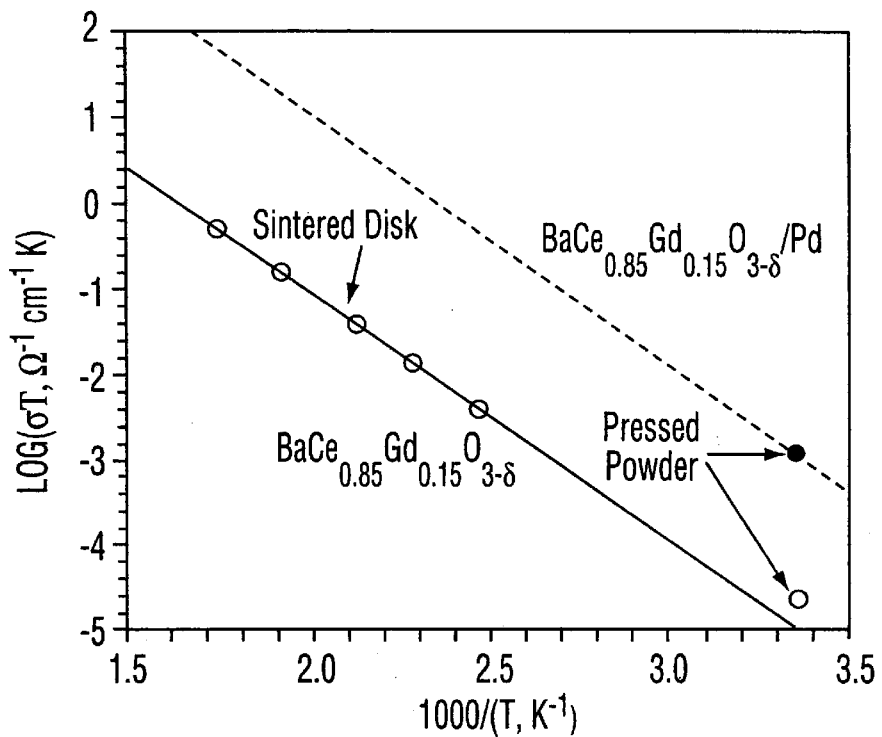
FIG. 2 is a graph showing the conductivity of $BaCe_{0.85}Gd_{0.15}O_3$ powder coated with Pd using a fluidized bed chemical vapour deposition.

As can be seen from FIG. 2, the results from the DC resistance method for the pressed powder of uncoated $BaCe_{0.85}Gd_{0.15}O_3$ agree well with the extrapolation of the AC impedance data obtained with sintered disks of $BaCe_{0.85}Gd_{0.15}O_3$. The conductivity of the Pd coated $BaCe_{0.85}Gd_{0.15}O_3$ obtained by the DC resistance method is about 2 orders of magnitude higher than that of the uncoated powder. Therefore, dense two-phase membranes fabricated from this method have a conductivity two orders of magnitude greater than that of $BaCe_{0.85}Gd_{0.15}O_3$ alone.

Example 2

A wet impregnation procedure was used in which the $BaCe_{0.85}Gd_{0.15}O_3$ powder was wet impregnated with a saturated $PdCl_2$ solution, dried, and the process repeated several times in order to obtain Pd loadings of about 15 and 30 vol %. The dried powder was then calcined at 250° C. to decompose the chloride, pressed in a die, and the disks sintered to 900° C. At this higher level of Pd loading, the sintering mechanism of the Pd coated grains becomes Pd to Pd rather than $BaCe_{0.85}Gd_{0.15}O_3$ to $BaCe_{0.85}Gd_{0.15}O_3$. Therefore, heating just above the PdO decomposition temperature (~800° C.) is sufficient for sintering.

Figure 3:
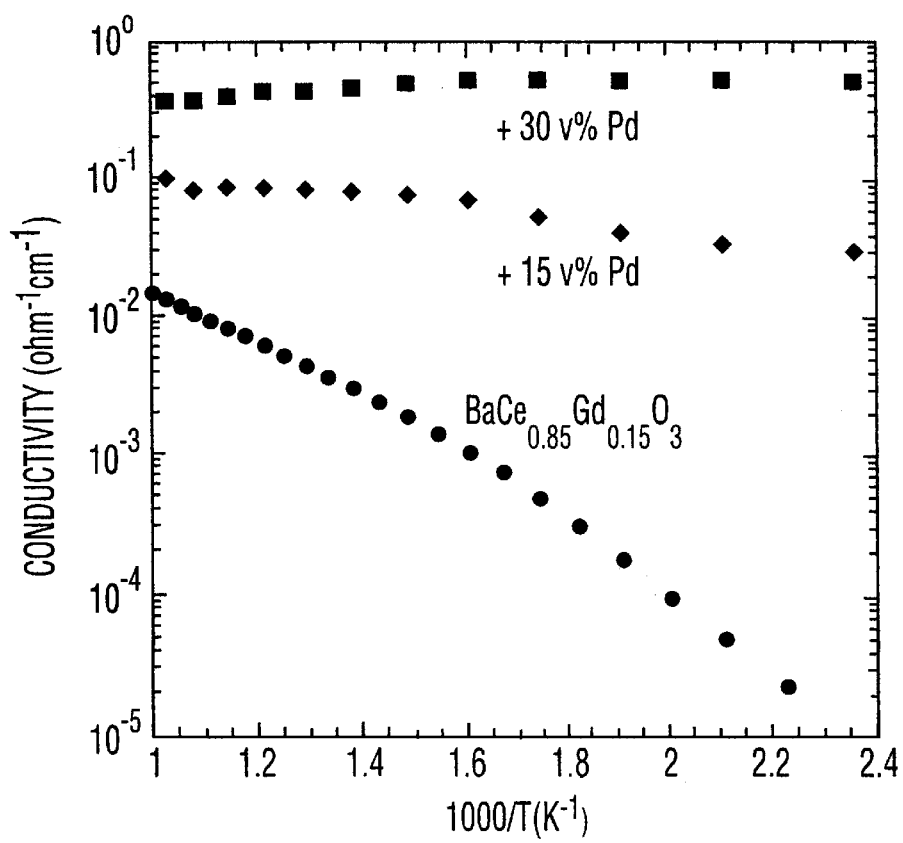
FIG. 3 is a graph showing the conductivity of the $BaCe_{0.85}Gd_{0.15}O_3$ powder coated with palladium by wet impregnation.

The conductivities of two-phase 15 and 30 volt Pd $BaCe_{0.85}Gd_{0.15}O_3$ composites are compared with that of $BaCe_{0.85}Gd_{0.15}O_3$ in FIG. 3. As can be seen in the figure, the conductivity of the two-phase material is dominated by the minority Pd phase. For the 30 vol % Pd case it is essentially metallic (decreasing slightly with increasing temperature). Moreover, the conductivity of the two-phase material is orders of magnitude higher than that of $BaCe_{0.85}Gd_{0.15}O_3$, depending on temperature. These results confirm that a two-phase $BaCe_{0.85}Gd_{0.15}O_3$—Pd membrane has the necessary electronic conductivity to obtain a satisfactory $H_2$ permeation flux.

Example 3

Samples of $BaCe_{0.85}Gd_{0.15}O_3$ were prepared by solid state synthesis from $BaCO_3$, $CeO_2$ and $Gd_2O_3$ by mixing and ball milling with zirconia media in ethanol for 10 hours.

The dried powder was then fired at 1000° C. for 10 hours, ball milled again and calcined at 1350° C. for 10 hours. The fully calcined powders were then immersed in a solvated mixture containing Pd resinate in neodecanoic acid and toluene. Toluene was added to reduce the viscosity of the resinate. Approximately 0.2 ml of resinate was required for saturation of 1.0 g of the powder. The impregnation was carried out by mild stirring of the powder and solvated mixture for 2 hrs. The organic part of the resinate and the toluene were burnt off in air at 120° C. The impregnated powders were then fired at 900° C. for 3 hrs under an inert atmosphere to convert any Pd from its oxide form to metallic form. The final volume fraction of metallic Pd from this impregnation and calcining procedure was 1.36 vol % Pd.

For flux measurements, disks were pressed uni-axially at 4074 psi and sintered at 1300° C. The disks were then carefully polished to a thickness of 2.0 mm, for permeation studies.

The 2 mm thick ceramic disks of $BaCe_{0.85}Gd_{0.15}O_3$—Pd and $BaCe_{0.85}Gd_{0.15}O_3$ without Pd were tested for hydrogen permeation. The discs were sealed between two glass O-rings. The average inner and outer diameters of the O-rings were 2.38 and 2.54 cm respectively, leaving an effective permeation area ~2.2 cm². The furnace was initially ramped to 950° C., held for 10 hours and then cooled to 700° C. at 3° C./min with a He flow on the sweep side so that the status of the glass seals could be measured as a function of time. By watching the partial pressures of $N_2$, $O_2$, He, and an Ar tracer gas (applied to the exterior of the sample assembly) it could be determined when a viable seal had been achieved. In this configuration, an $N_2$—$H_2$ (4%–96%) mixture was fed through the fuel side tubing at 30 cm³/min while on the sweep side He was flowed at a similar rate. The gas effluent in the He sweep was analyzed using on-line mass spectrometer. The flux was determined as a function of time and temperature from the $H_2$ partial pressure in the sweep gas, the He flow rate, and the effective permeation area, assuming the ideal gas law. Any gross $H_2$ leakage due to cracks in the disc was monitored by observing the $N_2$ partial pressure in the sweep as well as the exhaust flow rate on the fuel side. These results indicate that the seals hold down to a temperature of 400–450° C.

Figure 4:
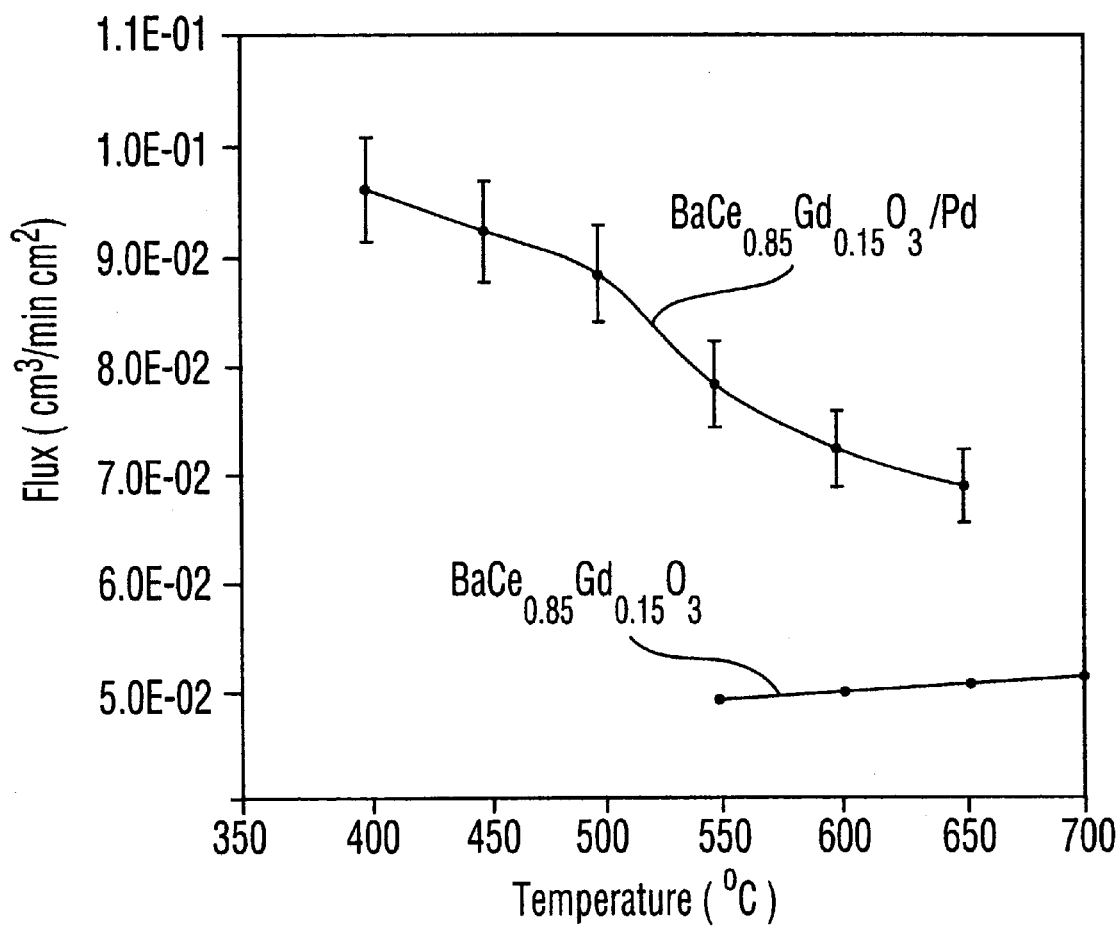
FIG. 4 is a graph showing $H_2$ permeation as a function of temperature through the $BaCe_{0.85}Gd_{0.15}O_3$-Pd membrane and a $BaCe_{0.85}Gd_{0.15}O_3$ membrane.

The $H_2$ permeation flux through $BaCe_{0.85}Gd_{0.15}O_3$—Pd is shown graphically in FIG. 4. The data in FIG. 4 was taken as a function of temperature while cooling from 700° C. to 400° C. at 3° C./min with a 30 minute hold at each 50 degree increment to allow for standardization of the flux. The error bars indicate the range of flux obtained at each 30 min temperature hold. Based on the time dependence in FIG. 4 the upper value of the error bar appears to be closer to the actual equilibrium flux value.

A corresponding $H_2$ permeation flux as a function of temperature was also obtained for $BaCe_{0.85}Gd_{0.15}O_3$ without Pd and plotted in FIG. 4. It can be seen that the $BaCe_{0.85}Gd_{0.15}O_3$—Pd provides a superior $H_2$ permeation flux.

In addition to the specific proton conducting oxides referred to in the above examples, a wide range of further oxides may also be used. These include $BaCe_{0.8}Sm_{0.2}O_3$, $BaCe_{0.9}Nd_{0.1}O_3$, $BaCe_{0.9}Y_{0.1}O_3$, $BaCe_{0.95}Y_{0.05}O_3$, $SrCe_{0.95}Yb_{0.05}O_3$, $BaZr_{0.95}Y_{0.05}O_3$, $SrZr_{0.95}Yb_{0.05}O_3$, $SrZr_{0.95}Y_{0.05})_3$, $CaZr_{0.9}In_{0.1}O_3$, $CaZr_{0.96}In_{0.04}O_3$, $CaZr_{0.95}In_{0.05}O_3$, $BaCe_{0.9}Yb_{0.1}O_3$, $BaCe_{0.8}Gd_{0.2}O_3$, $BaCe_{0.95}Nd_{0.05}O_3$, $BaCe_{0.8}Y_{0.2}O_3$, $SrZr_{0.96}Y_{0.04}O_3$, $CaZr_{0.9}In_{0.1}O_3$, $BaCe_{0.85}Eu_{0.15}O_3$, $BaCe_{0.85}Tb_{0.15}O_3$, etc.

The two-phase structure of the present invention has been found to have two primary advantages over a Pd alloy membrane. Firstly, the composite structure of the invention has more mechanical strength than a thin Pd film. Secondly, the composite structure of the invention is much cheaper than a Pd or Pd alloy film.

Moreover, the two-phase structure of this invention has been shown to have a dramatically higher conductivity than a single phase $BaCe_{0.85}M_{0.5}O_3$ protonic conductor. This increased conductivity is due to the electronic conduction of the Pd phase.

Although the present invention has been fully described in connection with the preferred embodiments thereof, it is to be noted that various changes and modifications are apparent to those skilled in the art. Such changes and modifications are to be understood as included within the scope of the present invention as defined by the appended claims.

What is claimed is:

1. A two-phase proton and electron conductor which comprises (a) a proton conductive oxide represented by the formula:

$$ABO_3$$

where A is selected from the group consisting of Ba, Ca, Mg and Sr and B is $Ce_{1-x}M_x$ or $Zr_{1-x}M_x$, where x has a value greater than zero and less than one and M is an element selected from the group consisting of Y, Yb, In, Gd, Nd, Eu, Sm and Tb, in combination with (b) an electron conductor comprising palladium.

2. A conductor according to claim 1 wherein M is Gd and x has a value between 0.05 and 0.40.

3. A conductor according to claim 2 comprising grains of a proton conductive oxide having the formula:

$$BaCe_{0.85}Gd_{0.15}O_3$$

together with palladium in an amount of about $10^{-10}$ to 50 vol %.

4. A conductor according to claim 3 containing less than 5 vol % palladium.

5. A conductor according to claim 4 wherein the palladium is coated on grains of a powder comprising the proton conductive oxide.

6. A process for hydrogen separation from a hydrogen-containing gas comprising contacting a first side of a gas impermeable mixed hydrogen ion and electronic conducting membrane with said hydrogen containing gas at an elevated pressure concurrently with contacting a second opposite side of said membrane with gas at a lower pressure than said hydrogen containing gas and withdrawing hydrogen ions from said second opposite side of said membrane, said mixed hydrogen ion and electronic conducting membrane being a two-phase conductor comprising (a) a perovskite-type oxide of the formula:

$$ABO_3$$

where A is selected from the group consisting of Ba, Ca, Mg and Sr and B is $Ce_{1-x}M_x$ or $Zr_{1-x}M_x$, where x has a value greater than zero and less than one and M is an element selected from the group consisting of Y, Yb, In, Gd, Nd, Eu, Sm and Tb, in combination with (b) electronic conductor comprising palladium.

7. The process according to claim 6 wherein the perovskite-type oxide is one in which x has a value between 0.05 and 0.40.

8. The process according to claim 7 wherein the conductor comprises grains of a proton conductive oxide having the formula:

$$BaCe_{0.85}Gd_{0.15}O_3$$

together with palladium in an amount of about $10^{-10}$ to 50 vol %.

9. The process according to claim 7 wherein the conductor contains less than 5 vol % palladium.

10. The process according to claim 7 wherein the palladium is coated on grains of a powder comprising the proton conductive oxide.

11. The process according to claim 7 which comprises reforming light hydrocarbon to produce synthesis gas with separation of hydrogen.

12. The process according to claim 7 which comprises converting natural gas to $H_2$ and higher hydrocarbons with separation of hydrogen.

13. The process according to claim 7 which comprises a fuel cell process for the production of energy.

* * * * *